United States Patent [19]

Kim

[11] Patent Number: 4,648,195
[45] Date of Patent: Mar. 10, 1987

[54] FISHING ROD ASSEMBLY

[76] Inventor: Jin C. Kim, 98-64, Bupyong Dong, Bug-ku, Inchon, Rep. of Korea

[21] Appl. No.: 784,597

[22] Filed: Oct. 4, 1985

[30] Foreign Application Priority Data

May 31, 1985 [KR] Rep. of Korea ............... 85-6456[U]

[51] Int. Cl.⁴ ............................................. A01K 87/06
[52] U.S. Cl. ............................................. 43/22; 43/20
[58] Field of Search ............... 43/22, 20, 23; 403/261, 403/256

[56] References Cited

U.S. PATENT DOCUMENTS

| | | | |
|---|---|---|---|
| 441,126 | 11/1890 | Boone | 43/22 |
| 500,447 | 6/1893 | Walker | 403/256 |
| 2,443,567 | 6/1948 | Moulton | 43/22 |
| 3,034,798 | 5/1962 | Portz | 43/23 |
| 3,175,323 | 3/1965 | Axelsson | 43/22 |
| 4,237,640 | 12/1980 | Sato | 43/22 |
| 4,516,351 | 5/1985 | Highby | 43/23 |

Primary Examiner—Nicholas P. Godici
Assistant Examiner—Kurt Rowan
Attorney, Agent, or Firm—Birch, Stewart, Kolasch & Birch

[57] ABSTRACT

A fishing rod assembly comprising a base frame including a stationary retainer and a gripping means for attaching a pair of legs of a reel whereby the reel can be tightly secured to the handle of the fishing rod.

4 Claims, 3 Drawing Figures

FISHING ROD ASSEMBLY

BACKGROUND OF THE INVENTION

The present invention relates to a fishing rod assembly and, more particularly, to an improved fishing rod assembly including a grip means for attaching a reel to the rod handle, whereby the reel can be tightly attached to the handle of the fishing rod in a very simple manner and very quickly.

There are many types of fishing assemblies which are well known in the art which utilize a screw ring nut for securing a reel to a gripping member of the handle portion of a fishing rod, as exemplified by U.S. Pat. No. 3,962.,813. However, these fishing rod assemblies suffer from a number of difficulties such as, for example, it takes a long time for fastening or releasing the screw ring nut, or the ring nut becomes loose from the fishing rod because of the movable reel while being used.

OBJECT AND SUMMARY OF THE INVENTION

Accordingly, it is an object of the present invention to provide an improved fishing rod assembly. an improved fishing rod assembly which is easy to assemble and is effective to tightly secure the reel to the rod in a short period fo time.

A further object of the present invention is to provide an improved fishing rod assembly in which the grip means is fastened so that it cannot be moved on the fishing rod.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

The present invention provides an improved fishing rod assembly including a grip means for tightly attaching a fishing reel to the handle of a fishing rod.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE DRAWINGS

Figure 1:
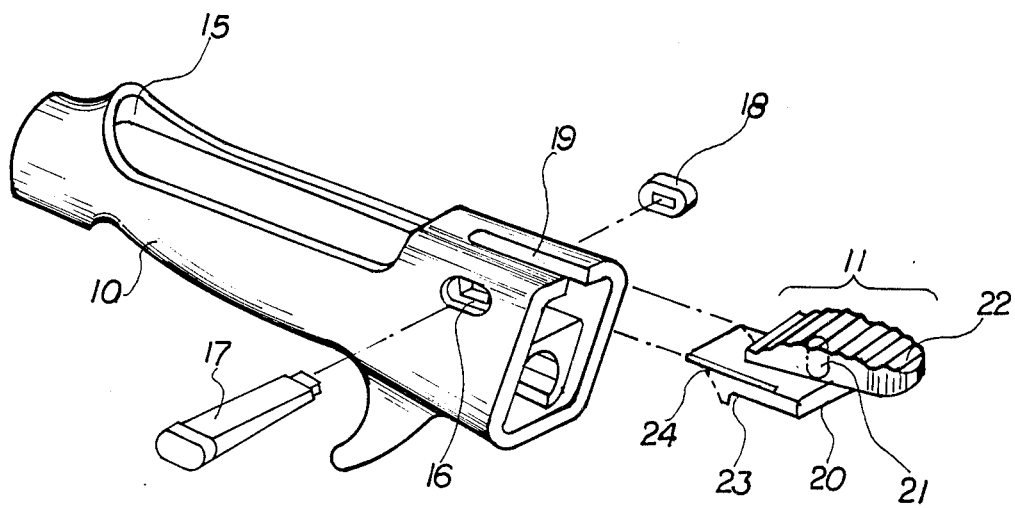
FIG. 1 is an exploded view showing the basic components of the fishing rod assembly of the present invention.
Figure 2:
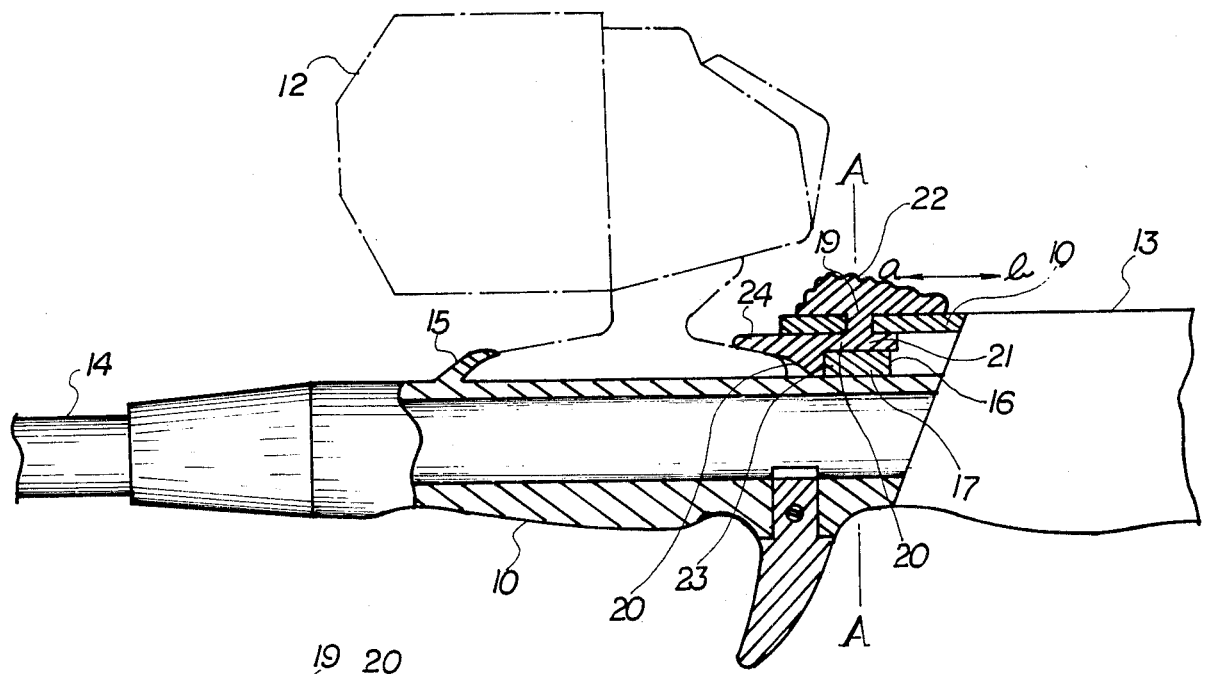
FIG. 2 is a cross-sectional view of the fishing rod assembly of the present invention showing a fishing reel attached to the handle of a fishing rod.

Referring in detail to the drawings for the purpose of illustrating the present invention, the fishing rod assembly in FIGS. 1 and 2 comprises a base frame 10 including a grip means 11 for attaching a reel 12, a handle 13 connected to one end of the base frame, and a rod 14 connected to the other end of the base frame. The base frame 10 has a stationary retainer 15 disposed on the top portion thereof for gripping the toe of the reel 12 and further contains apertures 16 disposed at both sides thereof for receiving a tapered wedge 17 for fixing the grip means 11 in position, utilizing a cap 18. Also, the base frame 10 includes a slot 19 disposed on the top portion thereof for cooperating with the grip means 11. The grip means 11 for securing the reel comprises a gripping plate 20, a connecting stud 21 extending from the gripping plate 20 and a threaded clamping plate 22 connected to the connecting stud 21. The gripping plate 20 is formed with a groove 23 for retaining the grip means 11 through the use of the tapered wedge 17 and an edge portion 24 disposed at the front thereof for gripping the reel 12.

Figure 3:
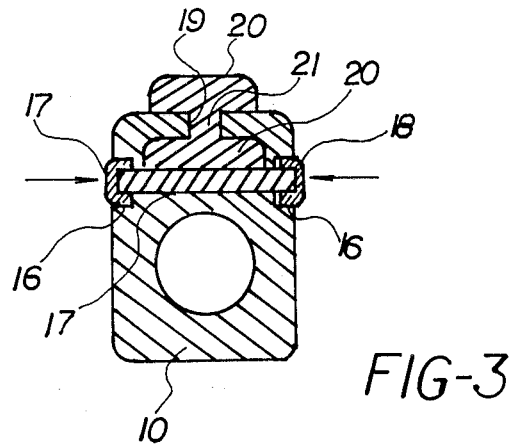
FIG. 3 is a cross-sectional view of the fishing rod assembly of the present invention, taken along line A—A of FIG. 2.

In operation, a pair of legs of the reel 12 is attached to the grip means 11. First of all, one leg of the reel 12 is attached to the stationary retainer 15 disposed at the front top portion of the base frame 10. Thereafter, the thread clamping plate 22 is depressed forward to the rod 14 so that the grip means 11 is moved in the direction indicated by arrow (a) from the handle 13 position shown in FIG. 1 to the base frame 10 position shown in FIG. 2. At this time, the grip means 11 is moved to its forward position by passing the connecting stud 21 through the slot 19 of the basic frame 10. The tapered wedge 17 is then wedged in apertures 16 and fixed in position with the cap 18. The grip edge 24 of the gripping plate 20 tightly grips the reel 12 as shown in FIG. 3. To release the reel 12, after the cap 18 is removed from the wedge 17, the tapered wedge 17 is removed from the apertures 16 and the grip means 11 is moved in the direction indicated by arrow (b) from the base frame 10 to the handle 13 as shown in FIG. 2. It takes only a short time to fasten or operate the grip means for attaching the reel 12 to the fishing rod.

The invention being thus described, it will be obvious that the same may be varied in many ways. Such variations are not to be regarded as a departure from the spirit and scope of the invention, and all such modifications as would be obvious to one skilled in the art are intended to be included in the scope of the following claims.

What is claimed is:

1. A fishing rod assembly comprising:
   a base frame containing a stationary retainer and a slot disposed on the top portion thereof,
   a handle connected to one end of said base frame,
   a rod connected to the other end of said base frame,
   an aperture extending through said base frame,
   gripping means adapted to secure a reel to said base frame, said gripping means containing, as a composite, a gripping plate, a connecting stud, a threaded clamping plate and a groove disposed at the back side of the gripping plate, said gripping means disposed to move forward or backward within said slot, and
   a wedge adapted to slidably engage through said apertures disposed on both sides of said base frame and said groove for locking said gripping means in its forward position whereby the reel is tightly mounted to the fishing rod.

2. The fishing rod assembly of claim 1 wherein the wedge has a tapered confirmation for tightly fixing the gripping means in its position.

3. The fishing rod assembly of claim 2 wherein the wedge is provided with an end cap for securing the wedge in its locking position.

4. The fishing rod assembly of claim 1, wherein the gripping plate contains an edge portion for gripping the rear leg of the reel.

* * * * *